United States Patent [19]

Gemeinhardt

[11] Patent Number: 4,834,930
[45] Date of Patent: May 30, 1989

[54] METHOD FOR THE MANUFACTURE OF APPARATUS FOR THE TRANSFER OF HEAT AND/OR MASS

[75] Inventor: Hermann Gemeinhardt, Obernburg, Fed. Rep. of Germany

[73] Assignee: Akzo N.V., Netherlands

[21] Appl. No.: 24,179

[22] Filed: Mar. 10, 1987

[30] Foreign Application Priority Data

Apr. 28, 1986 [DE] Fed. Rep. of Germany ....... 3614342

[51] Int. Cl.$^4$ ............................................. B29C 65/02
[52] U.S. Cl. ..................... 264/248; 165/173; 264/241; 264/259; 264/261
[58] Field of Search .............. 264/248, 262, 263, 266, 264/241, 259, 261; 165/173, 905

[56] References Cited

U.S. PATENT DOCUMENTS

| | | | |
|---|---|---|---|
| 2,433,546 | 12/1947 | Cornelius | 264/248 |
| 2,538,808 | 1/1951 | Swiss | 156/83 |
| 2,966,373 | 12/1960 | Yount | 165/178 |
| 3,315,740 | 4/1967 | Withers . | |
| 3,347,728 | 10/1967 | Preotle et al. | 165/173 |
| 3,419,069 | 12/1968 | Baker et al. . | |
| 3,435,893 | 4/1969 | Withers | 264/248 |
| 3,438,434 | 6/1969 | Smith | 165/178 |
| 3,459,622 | 8/1969 | Fischer | 156/423 |
| 3,529,664 | 9/1970 | Baker et al. | 165/178 |
| 3,592,261 | 7/1971 | Black | 165/178 |
| 3,616,022 | 10/1971 | Withers | 156/296 |
| 3,708,069 | 1/1973 | Clark | 210/181 |
| 3,718,181 | 2/1973 | Reilly et al. | 165/180 |
| 3,741,849 | 6/1973 | Hardy | 165/173 |
| 3,820,661 | 6/1974 | Pages | 210/321 |
| 3,841,938 | 10/1974 | Grosse-Holling et al. | 165/178 |
| 3,848,660 | 11/1974 | Reilley et al. | 165/1 |
| 3,993,126 | 11/1976 | Taylor | 165/79 |
| 4,044,443 | 8/1977 | Chartel | 165/173 |
| 4,047,563 | 9/1977 | Kurata | 165/158 |
| 4,098,852 | 7/1978 | Christen et al. | 261/104 |
| 4,177,816 | 12/1979 | Torgeson . | |
| 4,190,101 | 2/1980 | Hartman | 165/82 |
| 4,295,522 | 10/1981 | Frei | 165/79 |
| 4,300,971 | 11/1981 | McAlister | 165/178 |
| 4,481,057 | 11/1984 | Beard | 156/83 |

FOREIGN PATENT DOCUMENTS

| | | |
|---|---|---|
| 0176651 | 4/1986 | European Pat. Off. . |
| 1238621 | 4/1967 | Fed. Rep. of Germany . |
| 2019763 | 11/1970 | Fed. Rep. of Germany . |
| 2119906 | 11/1971 | Fed. Rep. of Germany . |
| 2114782 | 9/1972 | Fed. Rep. of Germany . |
| 2221951 | 11/1973 | Fed. Rep. of Germany . |
| 2334086 | 1/1974 | Fed. Rep. of Germany . |
| 1704261 | 1/1976 | Fed. Rep. of Germany . |
| 2617208 | 7/1977 | Fed. Rep. of Germany . |
| 2603615 | 8/1977 | Fed. Rep. of Germany . |
| 2141019 | 2/1980 | Fed. Rep. of Germany . |
| 3240143 | 5/1984 | Fed. Rep. of Germany . |
| 3338157 | 5/1985 | Fed. Rep. of Germany . |
| 264415 | 4/1966 | U.S.S.R. ............................ 165/173 |
| 121029 | 7/1976 | U.S.S.R. . |
| 1354502 | 5/1974 | United Kingdom ................ 165/905 |
| 1497204 | 1/1978 | United Kingdom . |

OTHER PUBLICATIONS

"Reverse-Osmosis Apparatus", Chemical Abstracts, vol. 78, Abstract No. 86407h.
S. Charlier et al., "Warmetauscher aus PVDF fur Aggesive Medien", CAV 1982, pp. 70, 72, 74.

Primary Examiner—James Lowe
Attorney, Agent, or Firm—Oliff & Berridge

[57] ABSTRACT

Heat and/or transferring apparatus which comprises at least one group of tubes from synthetic thermoplastic material, in which each tube end is surrounded by a sleeve from synthetic thermoplastic material having no porosity or a porosity of no more than 20% of the wall volume. All tube ends with sleeves of one group are surrounded by a second sleeve, whereby the sleeves of the tube ends have substantially the same length as the second sleeve. On the end face the tube ends are each fused with the sleeve end surrounding the same, adjacent sleeve ends are fused with one another, and external sleeve ends are fused with the second sleeve. The heat and/or mass transferring apparatus can be made by positioning each tube in a sleeve, assembling a group of tubes provided with sleeves and inserting the same into a second sleeve, and positioning the tubes within the sleeves and the second sleeve substantially vertically upward, whereupon theat is supplied from above, causing the tube ends to fuse with the sleeves, and the sleeves with one another or with the second sleeve.

9 Claims, 2 Drawing Sheets

METHOD FOR THE MANUFACTURE OF APPARATUS FOR THE TRANSFER OF HEAT AND/OR MASS

FIELD OF INVENTION

The invention relates to an apparatus for the transfer of heat and/or mass, comprising at least one group of tubes made from synthetic thermoplastic material. It is also concerned with a method of making such heat and/or mass transferring devices.

BACKGROUND OF THE INVENTION

The devices for the transfer of heat and/or mass of known construction consist of tubes or groups of tubes composed of a non-porous or porous material and embedded into a tube sheet. This tube sheet is fabricated either separately, in which case the tube ends must be fixed in the tube sheet at a later step, or the tube sheet is made during the manufacture of the heat and/or mass transferring apparatus by injecting a sealing compound between the tube ends. The manufacture of such heat and/or mass transferring devices is expensive, because either the tubes must be threaded into the tube sheet and positioned prior to fixing them therein, or special devices must be used to maintain the proper distance between the tube ends in order to be able to inject the sealing compound (self-curing material or plastic melt) between the tubes.

SUMMARY OF THE INVENTION

The present invention has an object the provision of an apparatus for transferring heat and/or mass that can be made in a simple manner. Moreover, the heat and/or mass transferring apparatus according to the invention has a compact structure in the area corresponding to that of the otherwise conventional tube sheet. Another object of the invention is to provide a very simple method for making this heat and/or mass transferring apparatus.

The above and other objects are achieved in this type of heat and/or mass transferring apparatus by surrounding each tube of a group with a sleeve of synthetic thermoplastic material that has no porosity or a porosity of no more than 20% of the wall volume, surrounding all the sleeved tube ends of a group with a second sleeve, the sleeves of the tube ends having substantially the same length as the second sleeve, and by fusing on their end face the tube ends with the sleeve end surrounding the same, fusing adjacent sleeve ends with one another, and fusing the outside sleeve ends with the second sleeve. For all practical purposes, such a heat and/or mass transferring apparatus no longer has need for the conventional tube sheet; the combination of sleeves and tube ends renders a compact arrangement of the tube ends possible without sacrificing the strength and tightness required at the inlet of a heat and/or mass transferring apparatus.

BRIEF DESCRIPTION OF THE DRAWINGS

The invention will be further explained by reference to the accompanying drawings, in which.

DETAILED DESCRIPTION OF PREFERRED EMBODIMENTS OF THE INVENTION

Figure 1:
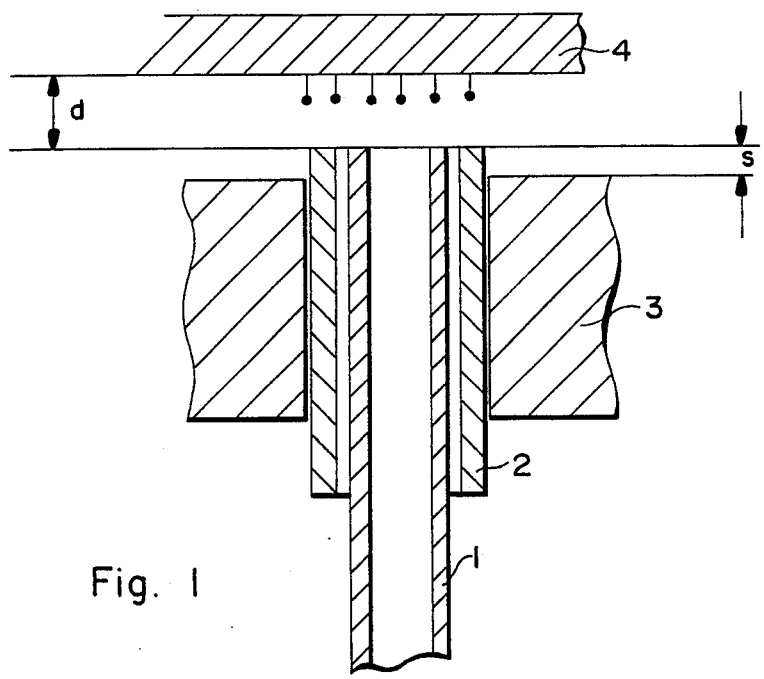
FIG. 1 is a cross-sectional view of a tube end positioned in a sleeve, and this sleeve is placed in a second sleeve prior to the thermal treatment.

Preferably, the sleeves surrounding the tube ends are made of thermoplastic material which, in the range between ambient temperature and melting temperature, has a mean linear coefficient between $100 \times 10^{-6}$ and $400 \times 10^{-6}$ 1/K.

As a rule, the tube ends, the sleeves enclosing the tube ends, and the second sleeve are fused with one another at least to a depth corresponding to the smallest wall thickness of the tubes.

If the outside cross section of the sleeves has a circular or hexagonal cross section, the heat and/or mass transferring apparatus incorporating the invention is particularly distinguished by the fact that the inside cross section of the second sleeve and the outside cross section of the group consisting of tube ends and sleeves is hexagonal in shape. However, any cross-sectional form is also suitable for the second sleeve as a compacted structure. Preferably, each group of tubes comprises 7 to 1141 tubes and, hence, also 7 to 1141 sleeves.

The term "tubes" as used herein includes all tubular bodies such as tubes, hoses, and hollow-fillament yarns. The cross-sectional shape of the tubes is not limited to circular cross sections; the tubes may also have cross sections that are elliptical or polygonal, e.g., triangular, quadrangular, square, pentagonal, etc. The wall thickness of the tubes defined by the outside and inside cross sections of the tubes along the circumference of the tubes may be the same or different. Outside and inside cross sections of the tubes may have the same or different cross-sectional forms. For instance, a tube may have a polygonal contour in its outside cross section and a circular or elliptical contour in its inside cross section. Also, the inside cross section of the tubes may have one or several continuous cavities, but a single tube may also comprise several individual tubes. These individual tubes may, for example, be arranged side by side axially parallel and the axes may be located on a straight line.

Preferably, each sleeve as well as the second sleeve are made of a thermoplastic polymer which is one of the fluorine polymers. Polyethylene or polypropylene can also be used as other preferred polymer materials for the sleeves and for the second sleeves. In this connection, it has been found to be most useful if the tube material and the sleeve material have the same or almost the same melting point or melting range. Advantageously, the tubes, the sleeves and the second sleeves are made of thermoplastic polymers which, in their basic structure, belong to the same class of polymer.

The heat transferring apparatus incorporating the invention is distinguished by the fact that the walls of the tubes have a porosity of no more than 20% of the wall volume. The mass transferring apparatus incorporating the invention is characterized by the fact that the walls of the tubes have a porosity of up to 90% of the wall volume. Such a mass transferring apparatus, depending on its application, can also function as a heat exchanger.

An object of the invention is also achieved by a method for making a heat and/or mass transferring apparatus according to the invention, which is distinguished by the fact that each tube end is positioned in its own sleeve, that the tube ends of at least one end of the tubes are assembled with the sleeves and are positioned in the second sleeve in such a way that the tube ends and the sleeve ends are positioned substantially vertically upward, flush with the second sleeve, or rising up to 4 mm thereabove, and tube ends and sleeve ends form a substantially flat surface, whereupon so much heat is supplied to the tube ends from above that the tube ends become fused with the sleeve ends and the sleeve ends expand such that they abut against the outer walls of adjacent sleeves or against the second sleeve.

As a rule, the thermal treatment is carried out in compliance with the following condition:

$$0.0175 < Qe \left( \frac{t}{\zeta C_p \lambda} \right)^{\frac{1}{2}} < 0.5,$$

in which:

Q is the amount of heat supplied, in J/m² s, per surface (end face) and time, e is the linear expansion coefficient of the tube material in 1/K, t is the time duration of the heating in seconds, $\zeta$ is the density of the tube material in kg/cm³, $C_p$ is the specific heat of the tube material in J/kg K, and $\lambda$ is the thermal conductivity of the tube material in J/msK.

The method of the invention produces the best results if the sleeves are made of a thermoplastic material which, in the range between ambient temperature and melting temperature, possesses a mean linear expansion coefficient between $100 \times 10^{-6}$ and $400 \times 10^{-6}$ 1/K.

Preferably, sleeve ends and/or tube ends are heated to a temperature that is above the melting temperature of the tube or sleeve material.

With the process of the invention, it has been found to be expedient if, prior to the thermal treatment, the sleeve ends and the tube ends are positioned in the opening of the second sleeve in such a way that the tube ends and the sleeve ends rise 0.5 to 3 mm above the second sleeve.

The process of the invention produces the best results if, prior to supplying heat, the sleeve ends are assembled to form a compact packing.

It has also been found to be most advantageous to use tubes whose hydraulic diameter is between 0.3 and 15 mm, preferably between 0.5 and 7.5 mm, and whose wall at the thinnest point is between 5 and 25%, preferably between 7.5 and 17.5%, of the hydraulic diameter.

As a rule, heat is supplied by heat radiation. In the case of heat radiation, the simplest way of supplying heat is by moving a heating plate toward the tube ends from above and positioning it at a distance therefrom, somewhere between 0.5 and 30 mm, until the tube ends become fused with the sleeves and the sleeves become fused with one another or with the second sleeve. The thermal treatment can be carried out in a vacuum or under a protective gas atmosphere, in which case the distance of the heating plate may be in a different range.

The invention will now be described in detail by reference to a practical embodiment.

The properties of the plastic material used in the following embodiment are listed in the table below.

TABLE

| Property | Determination according to | Unit | PVDF type I | PVDF type II |
| --- | --- | --- | --- | --- |
| density | ASTM D 792 | g/cm³ | 1.78 | 1.78 |
| melt flow index | ASTM D 1238 | | | |
| —230° C. 10 kg | | g/10 min | 50 | 13 |
| —230° C., 5 kg | | g/10 min | 18 | 4 |
| —230° C., 2.16 kg | | g/10 min | 6 | 1 |
| crystalline melting point | | °C. | 177 | 177 |
| linear expansion coefficient | ASTM D 696 | K⁻¹ | $106 \times 10^{-6}$ | $128 \times 10^{-6}$ |
| heat conductivity | ASTM C 177 | W/m. K | 0.19 | 0.19 |
| specific heat between 0 and 100° C. | | J/kg. K | 960 | 960 |
| tensile strength 5 mm/min | ASTM D 638 | MPa | 57 | 54 |
| elongation 5 mm/min | ASTM D 638 | % | 12 | 80 |
| modulus at 1 mm/min | ASTM D 638 | MPa | 2600 | 2400 |

91 tubes of PVDF Type I, having an outside diameter of 2 mm and a wall thickness of 0.1 mm, are combined into a bundle such that they can be inserted into a hexagonal opening of a sleeve made of PVDF Type II with a length of 30 mm. Each side of the hexagonal opening of the sleeve is 12 mm long and all the corners of the hexagon are located on a circle. The walls of the hexagonal opening are chamfered in such a way that the bevels of opposing walls enclose an angle of 45° and the bevel reaches a depth of 1.25 mm. The tubes have a length corresponding to the length of the sleeve and are positioned in the sleeve in such a way that, on their end face, they form a flat surface flush with the sleeve. Now, one end of another tube is positioned in each tube. These tubes consist of PVDF and have an outside diameter of 1.5 mm, a wall thickness of 0.25 mm, and a porosity of 50% of the wall volume. The tube ends of these second tubes are so positioned that—toward their end face—they are flush with the first tubes and with the sleeves.

A round heating plate with a diameter of 100 mm and an emission coefficient of 0.9 was heated to a temperature of 430° C., then held for 2 minutes at a distance of 10 mm above the essentially vertically positioned tube ends and sleeve ends. After the cooling, it can be determined that all the sleeves have become fused with one another or with the sleeve to a depth of 1 mm from the end face, whereby at the same time each tube end has become fused with the sleeve end to a depth of 2 mm.

FIG. 1 shows in the second sleeve (3) a sleeve (2), and in sleeve (2) one tube (1) is positioned in such a way that tube end (1) and sleeve end (2) rise above the second sleeve (3) by an amount (s). For thermal treatment, a heating plate is directed toward the tube ends from above at a distance of (d).

Figure 2:
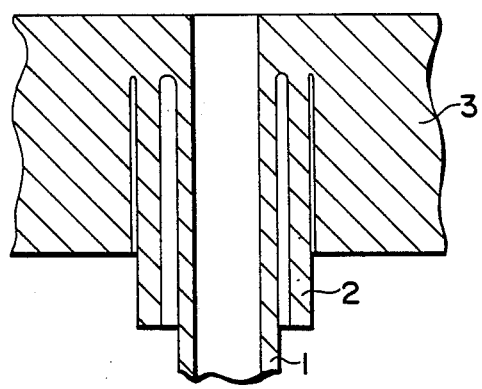
FIG. 2 is a cross-sectional view of the arrangement shown in FIG. 1, after the thermal treatment.

After the thermal treatment, the ends of tubes (1) are fused with the ends of sleeve (2), and the ends of sleeve (2) are fused with the second sleeve (3), as shown in FIG. 2.

For the sake of simplicity, FIGS. 1 and 2 show only one tube end (1) and one sleeve (2).

Figure 3:
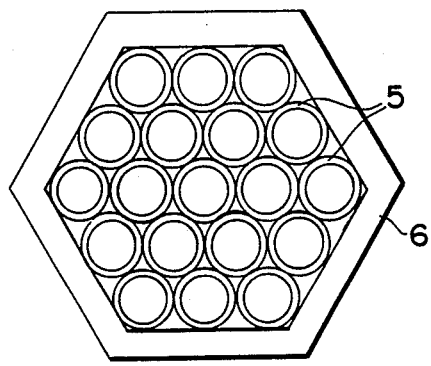
FIG. 3 is a top plan view of an arrangement of tube ends prior to the thermal treatment.
Figure 4:
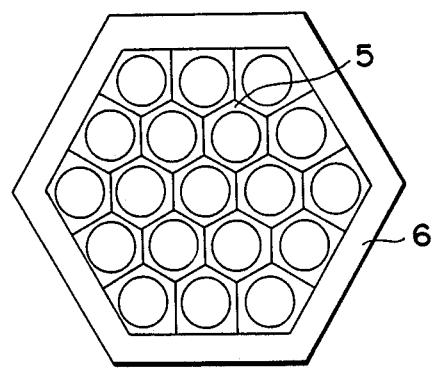
FIG. 4 is a top plan view in accordance with FIG. 3, after the thermal treatment.

FIGS. 3 and 4 are top plan views of a possible arrangement of tube/sleeve combinations (5) in a second sleeve (6) with a hexagonal cross section, each tube/ sleeve combination (5) being shown as a single tube in the interest of clarity. FIG. 3 shows this arrangement prior to the thermal treatment. After the thermal treatment, the arrangement assumes the appearance shown in FIG. 4.

One end of a tube/sleeve combination (5) that has fused with six adjacent tube/sleeve combinations, has a hexagonal contour on the end face (viewed from the top). One end of a tube/sleeve combination which is adjacent to the second sleeve (6) has a contour which can be described as a pentagon with unequal corner angles and unequal sides, whereby the pentagons forming the contour of the ends of the tube/sleeve combinations are shaped such that the contour line between two tube/sleeve combinations encloses an angle of 120° with a second contour line between two tube/sleeve combinations, but encloses an angle of 90° with a contour line between a tube/sleeve combination and the second sleeve.

What is claimed is:

1. A method suitable for making both heat and mass transferring devices comprising at least one group of tubes made from synthetic thermoplastic material, wherein at least one end of each tube is positioned in one first sleeve, the sleeved tube ends are assembled and positioned in a second sleeve in such a way that the tube ends and the first sleeve ends are positioned substantially vertically upward, flush with the second sleeve or rising up to 4 mm thereabove, and the tube ends and first sleeve ends form a substantially flat surface, and heat is supplied to the tube ends from above to fuse the tube ends with the first sleeve ends and to expand the first sleeve ends such that they abut against outer walls of adjacent first sleeves or against the second sleeve and become fused with said first sleeve ends or with the second sleeve, wherein the tubes, the sleeves and the second sleeves are made of thermoplastic polymers which have similar melting points or ranges.

2. The method as set forth in claim 1, wherein the heating is carried out in compliance with the following condition:

$$0.0175 < Qe\left(\frac{t}{\zeta C_p \lambda}\right)^{\frac{1}{2}} < 0.5,$$

in which

Q is the amount of heat supplied per surface (end face) and time in J/m s, e is the linear expansion coefficient of the tube material in 1/K, t is the time duration of the heating in seconds, $\zeta$ is the density of the tube material in kg/cm$^3$, $C_p$ is the specific heat of the tube material in J/kg K, and $\lambda$ is the thermal conductivity of the rod material in J/msK.

3. The method as set forth in claim 1, wherein said first sleeves are made of a thermoplastic material which, in the range between ambient temperatures and melting temperatures, has a mean linear expansion coefficient between $100 \times 10^{-6}$ and $400 \times 10^{-6}$ 1/K.

4. The method as set forth in claim 1, wherein said first sleeve ends and tube ends are heated to a temperature which is above the melting temperature of the tube material or first sleeve material.

5. The method as set forth in claim 1, wherein, prior to the heating, the first sleeve ends and the tube ends are positioned in an opening of the second sleeve in such a way that the tube ends and the first sleeve ends rise 0.5 to 3 mm above the second sleeve.

6. The method as set forth in claim 1, wherein the first sleeve ends are assembled to form a compact packing prior to supplying heat thereto.

7. The method as set forth in claim 1, wherein said tubes have a hydraulic diameter between 0.3 and 15 mm and have a wall thickness at the thinnest point between 5 and 25% of the hydraulic diameter.

8. The method as set forth in claim 7, wherein the hydraulic diameter is between 0.5 and 7.5 mm.

9. The method as set forth in claim 7, wherein the wall thickness at the thinnest point is between 7.5 and 17.5% of the hydraulic diameter.

* * * * *

UNITED STATES PATENT AND TRADEMARK OFFICE
CERTIFICATE OF CORRECTION

PATENT NO. : 4,834,930
DATED : May 30, 1989
INVENTOR(S) : Hermann GEMEINHARDT

It is certified that error appears in the above-identified patent and that said Letters Patent is hereby corrected as shown below:

Title page:

IN THE REFERENCES CITED:

Under "OTHER PUBLICATIONS", line 4, change "Aggesive" to --Aggressive--.

IN THE ABSTRACT:

Line 1, after "and/or" insert --mass--;
Line 18, change "theat" to --heat--.

Signed and Sealed this

Sixth Day of March, 1990

Attest:

JEFFREY M. SAMUELS

Attesting Officer

Acting Commissioner of Patents and Trademarks